United States Patent [19]

Gilbert et al.

[11] 3,764,922

[45] Oct. 9, 1973

[54] AMPLIFIER OFFSET COMPENSATION ARRANGEMENT

[75] Inventors: Edward O. Gilbert; Theodore A. Oliver, both of Ann Arbor, Mich.

[73] Assignee: Reliance Electric Company, Cleveland, Ohio

[22] Filed: Oct. 14, 1971

[21] Appl. No.: 189,162

[52] U.S. Cl. .................. 328/162, 307/229, 328/127

[51] Int. Cl. ..... H04b 1/10, H04b 15/00, H03k 1/10

[58] Field of Search .......................... 307/229, 243; 328/162, 163, 165, 104, 127, 154

[56] References Cited

UNITED STATES PATENTS 3,654,560 4/1972 Cath et al. ..................... 307/230 X 3,200,338 8/1965 Ellis .............................. 328/127 X

*Primary Examiner*—John Zazworsky

*Attorney*—Richard G. Stephens

[57] ABSTRACT

Different analog signals are successively connected to an amplifier, which may have a variable gain controlled by a digital computer, for example. When each analog signal is to be connected to the amplifier, the amplifier is first switched into a stabilizing mode in a closed-loop with an integrator so that the integrator charges up to a value commensurate with the offset voltage of the amplifier. The integrator output is then connected to the variable-gain amplifier during an immediately-following measurement mode to compensate for the amplifier offset.

8 Claims, 5 Drawing Figures

AMPLIFIER OFFSET COMPENSATION ARRANGEMENT

A wide variety of computer, automatic control, and instrumentation applications include multiplexing apparatus which scans a plurality of lines carrying analog signal voltages (or currents) to apply them selectively to a processing device. For example, the control of many industrial systems and processes requires that the DC levels of signals produced by a variety of transducers at given times be selectively connected to an analog-to-digital converter to provide input signals to a digital computer, or to a digital voltmeter to provide an indication. Many systems include transducers of rather diverse types, such as thermocouples, tachometers, potentiometers, strain gages, pH cells, etc., so that some analog signals may vary over a range of only a few millivolts, while others vary over a range of several volts. Some signals to be converted may comprise a transducer signal which has been modulated, transmitted over a pair of lines and then demodulated. It is frequently necessary, or at least desirable in the interests of economy, that a single A/D converter, digital voltmeter, or other device be used to convert, measure or otherwise process all of the analog signals, and when several magnitude ranges of analog signals must be converted, it will be apparent that the multiplexer system must connect the analog signal being converted or measured at a given time to the converter through a variable gain device of some type. While simple switched resistive attenuators might be suitable for changing the gain in a limited number of applications, it is necessary or at least desirable in many applications that the variable gain device present a very high input impedance to the signal being measured, so that an amplifying device is required as part of the variable gain device. One object of the present invention is to provide an improved variable gain device for connecting output signals from an analog signal multiplexer to an analog signal-processing device, such as an A/D converter or the like.

It is well-known that conventional DC amplifiers are quite subject to drift with temperature variations, so that a zero input signal undesirably provides a finite output offset voltage varying in magnitude with temperature. While a variety of drift stabilizing techniques have been developed, for general purpose analog computation, for example, most of them are undesirable complex and expensive. Some prior art stabilized amplifier circuits have an undesirably low input impedance. Some prior art stabilized amplifier circuits introduce substantial noise, and some require an undesirably long time to stabilize after their gain is changed. Thus another object of the invention is to provide an improved, simple and economical analog signal gain-changing device for connecting signals from a multiplexer or like device to a signal-processing device, where any drift of the gain-changing device is effectively minimized or cancelled out. In such a system where a variety of different values of gain are used, the maximum amount of offset allowable to provide a given system accuracy varies inversely with the selected gain value.

The function of the multiplexer in the above-mentioned application is to connect one of the analog signals to the converter for a limited time, then to disconnect that analog signal and connect a different one of the analog signals to the converter for a limited time, etc. A wide variety of multiplexing circuits are shown, some of which can scan and select the input signals only in a predetermined sequence, and others of which select the signals in any sequence dictated by address signals which a computer or other control device may provide. While the invention will be illustrated in connection with the latter type of multiplexer, it will become apparent that the invention is applicable to either type of multiplexer.

A primary object of the present invention is to provide an improved offset-compensated variable-gain device for connecting output signals from an analog signal multiplexer to an analog signal-processing device.

Another object of the present invention is to provide such a device which is simple, economical, reliable, and less sensitive to noise.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a schematic diagram of an exemplary form of the programmable-gain amplifier unit.

FIGS. 1*a* and 1*b* are simplified circuit diagrams useful in understanding the operation of the circuit of FIG. 1.

Figure 1:
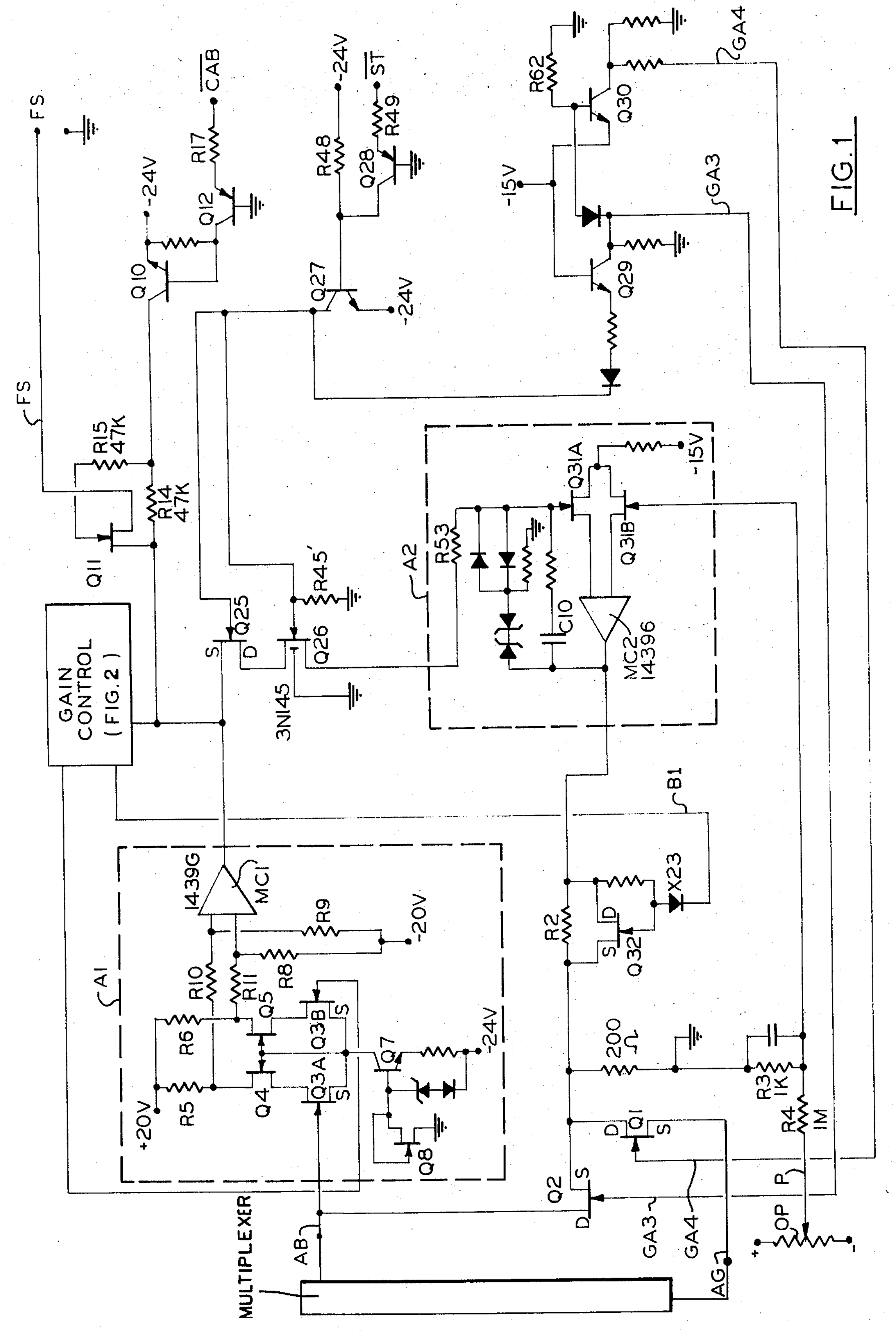

In a typical application of the present invention a digital computer which controls a plant might be connected to receive digital signals from an analog-to-digital converter, which in turn receives analog signals from the amplifier system of the present invention, individual ones of a large group of analog signals being successively applied to the amplifier system by a suitable multiplexer system. In the system to be described the computer is assumed to address a suitable multiplexer by sending data specifying which channel input of the multiplexer is to be amplified and the gain with which it is to be amplified; and then the computer starts the multiplexer-amplifier system through an operating cycle. During the operating cycle the amplifier is first connected in the specified gain configuration and stabilized, the selected analog input signal is then applied to the amplifier, the amplifier output allowed to settle, and then the amplifier output is connected to an analog-to-digital converter or the like. In the specific amplifier system to be described, the total operating cycle consumes approximately 5 milliseconds. The multiplexer is assumed to include a control unit which applies a number of control signals to the amplifier unit, the function of each such control signal being pointed out below.

Assume that the analog-to-digital converter or digital voltmeter is designed to accept signals over a zero to 10-volt range. If one assumes that the signals must be converted or measured with an accuracy of 0.1 percent, it will be apparent that the output voltage of the gain-changing device must not have an error due to offset which exceeds 0.01 volts, i.e. 10 millivolts. If the offset error at the gain-changer output is not to exceed 10 millivolts and the gain-changer has a gain of unity, the offset error at the gain-changer input similarly cannot be allowed to exceed 10 millivolts. However, for the same overall system accuracy, the allowable offset error at the gain-changer input must decrease as the gain of the gain-changer is increased. Thus if the gain is increased to values of 10, then 100 and then 500, the allowable offset error at the gain-changer input must decrease to values of no more than 1 millivolt, then 100 microvolts, and then 20 microvolts, respectively. Thus the allowable offset referred to input varies greatly as the gain is varied.

The input signals typically may be selectively connected into the multiplexer using either double-pole electromechanical relays, or using various grounded transistor switches. In FIG. 1, the input signal selected by the multiplexer by closure of a selected relay is applied to lines AB and AG, and thence to the programmable amplifier unit. In the system being described, when the computer or other control device operates a given relay to sample a given signal, the multiplexer control unit also applies a coded gain control signal to the circuit of FIG. 1 to provide a desired circuit gain, and hence the circuit of FIG. 1 applies the input signal to a further signal-processing device, such as an A/D converter, with a selected scale factor. After a given pair of input lines have been connected to amplifier unit PGA for a given time, they are disconnected by the digital computer. Then the digital computer may connect a different pair of input lines of a multiplexer to the amplifier PGA, with either the same or a different gain. During a brief instant before any pair of signal lines is connected to the A/D converter, the variable gain amplifier circuit of the associated multiplexer is switched into a stabilizing mode, in which any offset in the amplifier circuit is sensed and compensating means are automatically adjusted so that the effect of such offset will be cancelled out when the analog signal on the pair of lines is applied to the amplifier unit by the next selected relay. The mode of operation which occurs while the circuit of FIG. 1 translates an input signal from the multiplexer to the output device will be termed the measurement mode, and the mode occurring in between measuring modes while the circuit adjusts itself to compensate for offset will be termed the stabilizing mode.

Figure 1A:
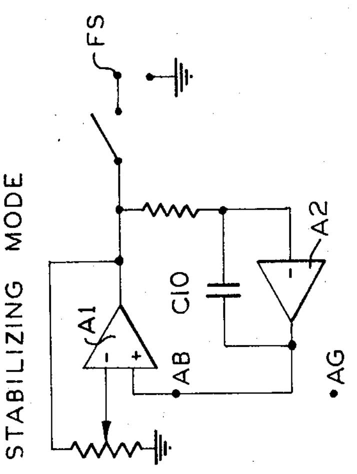
Figure 1B:
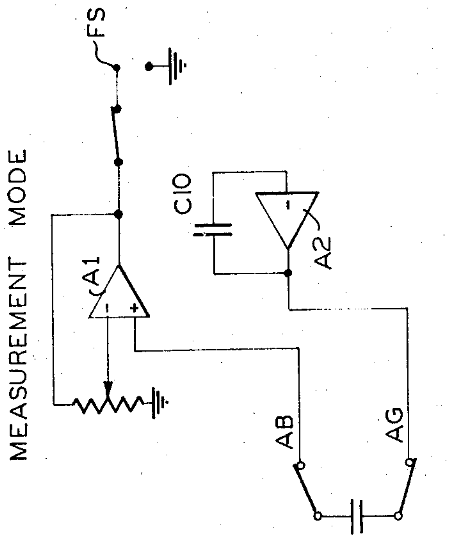

An understanding of the detailed circuitry of FIG. 1 is considerably facilitated by prior reference to FIGS. 1*a* and 1*b*, wherein simplified schematics illustrate the basic configuration of the circuit in the stabilizing and measurement modes, respectively. The invention includes two high-gain direct-coupled feedback amplifiers A1 and A2 having differential input circuits. A feedback capacitor C10 is connected from the output of amplifier A2 to its inverting input line, so that A2 and C10 comprise an integrator circuit. During the stabilizing mode, the output voltage of amplifier A2 is applied to the non-inverting input line of amplifier A2, and then the two amplifiers will be seen to be connected in a closed loop. The loop is stable (non-divergent) because there is an odd number of signal inversions around the loop. The gain around the loop is basically proportional to the product of the overall gains of the two amplifiers, divided by any attenuation in other components in series in the loop.

Assume that amplifier A1 has drifted, so that it has an appreciable positive output voltage offset, and assume initially that amplifier A2 has no voltage offset. The positive voltage at the output of amplifier A1 will be seen to apply an input current to amplifier A2, providing an increasing negative output voltage from amplifier A2. As the negative voltage from A2 increases, it will be seen to drive the non-inverting input line of A1 in a direction so as to decrease the A1 output voltage. When the integrator output voltage has increased to a value equal to the A1 offset (referred to input), the A1 amplifier output will be zero, and the charging up of the A2, C10 integrator circuit will cease. Capacitor C10 then will be charged to a voltage equal to the A1 voltage offset (referred to input). If amplifier A1 had drifted in an opposite direction, it will be apparent that A2 would have integrated in an opposite direction. The time required for A2 to integrate to a value sufficient to drive the A1 output to zero will be seen to depend upon the integrator time-constant established by the value of capacitor C10, the input impedance shown connecting the A1 output to the A2 output, and the loop gain of the A1,A2 loop. The use of a very short time-constant allows the use of very brief stabilizing modes, but increases the rate of the drift or change in the integrator output voltage which may occur while the circuit is switched into its measurement mode. As will be seen below, the programmable gain circuit is temporarily switched into its stabilizing mode immediately prior to each of its measurement mode periods, so that very little drift of the integrator circuit can occur while a measurement is being effected.

The above explanation assumed that amplifier A2 had no voltage offset. If A2 does have some voltage offset, the steady-state conditions to which the circuit of FIG. 1*a* will drive during the stabilizing mode will include a finite output voltage from A1 rather than zero output voltage, with its polarity dependent upon the direction of the A2 voltage offset. If the A2 voltage offset referred to input is 5 millivolts, for example, the steady-state value of the A1 output will be ±5 millivolts, and if amplifier A1 has unity overall gain, the steady-state value to which capacitor C10 will charge will not equal the A1 offset voltage, but instead a value equal to the A1 offset voltage plus or minus 5 millivolts. If the A2 voltage offset referred to input is 5 millivolts and amplifier A1 has a gain of −500 rather than unity, the steady-state output voltage of amplifier A1 will become ±5 millivolts, but the steady-state output voltage to which capacitor C10 will charge then will equal the A1 offset voltage ±5 mv/500, or equal to the A1 offset voltage within ±10 microvolts. Because amplifier A2 has very high loop gain (a DC gain between $10^5$ and $10^6$) the precise value of its gain does not appreciably affect the steady-state values to which the circuit balances during the stabilizing mode.

Referring now to FIG. 1*b*, it will be seen that during the measurement mode which immediately follows each stabilizing mode, the input signal from A1 to A2 is disconnected, so that the integrator circuit continues to provide the output voltage which it reached during the previous stabilizing mode, assuming that the A2 output voltage does not change due to leakage in capacitor C10, or due to leakage current at the integrator input terminal. The steady output voltage from the integrator will be seen in FIG. 1*b* to be applied to signal input line AG during the measurement mode, with signal input line AB connected to the non-inverting input line of amplifier A1. Thus the offset-compensating output voltage of amplifier A2 is connected in series with and algebraically added to the signal voltage, which is assumed in FIG. 1*b* to exist across a capacitor connected to input lines AB and AG by a pair of relay contacts. The addition of the integrator output voltage to the signal voltage will be seen to completely compensate during the measurement period for any offset in amplifier A1, assuming that A1 does not drift appreciably further during the measurement period, and assuming that the integrator circuit output does not vary appreciably during the measurement period. The compensating voltage need not be connected directly in series with the input voltage in order to compensate properly, as will be made clear in connection with an alternative arrangement described in connection with FIG. 3.

Because the capacitor (not shown) connected to input lines AG and AB is not connected to ground, none of the input line circuitry will impose any load on the integrator-produced offset correction. If a different type of switch is used in the multiplexer in place of the relays, it is very important that it provide very high impedance to ground. It is also important, in order to avoid decay of the capacitor output being measured during a measurement period, that the amplifier A1 non-inverting input line present a very high impedance. Various prior art stabilized amplifiers are disadvantageous in that they present an undesirably low input impedance, requiring that measurement periods be very brief to minimize error.

Upon the disconnection of the input signal to amplifier A2 during the measurement period, any leakage current into amplifier A2 causes the A2 output voltage to change, at a rate inversely proportional to the value of capacitor C10. By insuring that a measurement period immediately follows a stabilizing period, one can minimize the error which drift in amplifier A2 otherwise might cause.

With the sum of the input signal and the offset compensating signal applied in series to the A1 non-inverting input line during the measurement mode, it will be seen that a non-inverted replica of the input signal will appear at the output terminal of amplifier A1. The magnitude of the output signal will depend upon the overall gain of amplifier A1, which is governed by the fraction of the A1 output voltage that is connected back to the inverting input line of amplifier A1. As symbolized by the variable potentiometer shown in FIG. 1*b*, the gain of amplifier A1 during the measurement mode is selected by varying the fraction of the A1 output feedback to the input. During the measurement mode the output voltage from amplifier A1 is connected through a switch to an output device, such as an A/D converter or digital voltmeter, which is connected between line FS and ground.

Referring now to FIG. 1, amplifiers A1 and A2 are each shown as comprising an FET differential input stage followed by a monolithic or integrated circuit operational amplifier (MC1, MC2). During the stabilizing mode the output of integrator amplifier A2 must be connected to the non-inverting input of amplifier A1. To provide such a connection line $\overline{ST}$ from the control unit is driven negative during the stabilizing mode, cutting off transistors Q28, Q27 and Q29 and turning on transistor Q30 so that line GA3 is raised to ground potential to turn on field-effect transistor Q2, connecting the A2 output from MC2 via resistor R2 to input line AB, which is connected to the non-inverting input line of A1 at the gate of transistor Q3A.

As mentioned above, the time required for the integrator to reach its steady-state value during the stabilizing mode depends upon the gain around the A1, A2 loop circuit. When the gain of amplifier A1 is set at 8, 64 or 512, line B1 to the Q32 gate is negative, so that Q32 is cutoff and the A2 output from MC2 is applied via resistor R2. When the A1 gain is set at unity, however, line B1 is driven high, so that Q32 conducts, shorting across resistor R2, and thereby increasing the loop gain around the A1, A2 loop, and preventing the decreased A1 gain setting from undesirably increasing the time required for the A2, C10 integrator circuit to reach a steady-state value. The manner in which the signal on line B1 is derived is explained in connection with FIG. 2.

The differential input stage of amplifier A1 comprises two series pairs of field-effect transistors, Q3A in series with Q4, and Q3B in series with Q5. Positive supply voltage from a +20-volt source is connected through respective load resistors R5 and R6 to each of the series pairs, and the source electrodes of Q3A and Q3B are connected together through a constant-current regulator circuit (Q7 and Q8) to a negative supply terminal, −24V. Transistors Q3A and Q3B are preferably matched transistors having closely similar electrical and temperature characteristics, and preferably mounted in the same can. The differential stage output line from the drain electrode of Q4 is connected through a voltage divider (R10, R9) to a −20-volt supply terminal, with a tap on the voltage divider connected to one input line of monolithic amplifier MC1. The other output line of the differential stage extends from the Q5 drain through a similar voltage divider (R11, R8) to the −20V terminal, with a similar voltage divider tap being connected to the opposite input signal line of amplifier MC1. Conventional "rolloff" or shaping networks, and various conventional protective limiters and power supply decoupling capacitors associated with the amplifiers of FIG. 1 have been omitted for sake of clarity.

During the stabilizing mode the output of amplifier A1 must be connected to the inverting input line of amplifier A2, as shown in FIG. 1*a*. To provide such a connection, the output line of MC1 is connected through transistors Q25 and Q26 and resistor R53 to the gate of transistor Q31A at the input of amplifier A2. During the stabilizing mode the negative logic 0 signal applied at terminal $\overline{ST}$ (right side of FIG. 1), from the control unit cuts off transistor Q28 and −24v is applied to both base and emitter of transistor Q27, cutting off that transistor, and thereby allowing transistors Q25 and Q26 to connect the A1 amplifier output to the A2 amplifier input via resistor R53. At times other than during the stabilizing mode, a positive logic 1 signal applied at terminal $\overline{ST}$ turns on Q28, the limited output current of which turns on Q27, dropping the Q27 collector to a negative value sufficient to cut off both Q25 and Q26. Amplifier A2 will be seen to include a high impedance differential input stage comprising transistors Q31A and Q31B, which are also preferably matched in the same way as Q3A, Q3B. The drain electrodes of Q31A and Q31B are connected to the two differential inputs of monolithic operational amplifier MC2. The second input to amplifier A2 at the gate of Q31B is connected through a large resistance (R4) to line P, and connected through a relatively low resistance R3 to ground. Line P connects to potentiometer OP, which may be adjusted to balance out any voltage offset in amplifier A2.

During the stabilizing mode, a logic 1 positive voltage is applied from the control unit on line $\overline{CAB}$ to turn on transistor Q12, thereby turning on transistor Q10 and cutting off transistor Q11, so that the amplifier A1 output voltage is disconnected from output line FS. With the amplifiers A1 and A2 connected in a closed loop as described in connection with FIG. 3*a*, amplifier A2 will integrate, as previously described, until the voltage across capacitor C10 equals the amplifier A1 offset voltage.

During the measurement mode, the amplifier A2 output line must be connected to the AG input line, as shown in FIG. 1*b*. During the measurement mode a positive signal on line $\overline{ST}$ from the control unit turns on transistor Q28, thereby turning on Q27 and Q29 and turning off Q30, so that the Q30 collector reses. The Q30 collector rise is applied on line GA4 to turn on transistor Q1, and the GA3 line to Q2 is lowered slightly earlier to cut off Q2. The amplifier A2 output voltage then will pass along line AG to raise the multiplexer capacitor connected between lines AG and AB, so that the sum of the offset correction voltage and the sample signal voltage on the capacitor will be applied to amplifier A1, as described above. During the measurement mode a logic 1 positive signal at terminal $\overline{ST}$ will result in cutoff of Q25 and Q26 as described above, disconnecting the A1 output from the A2 input. Also, a negative logic 0 signal at terminal $\overline{CAB}$ will cut off transistor Q12 and result in Q11 being turned on, so that the amplifier A1 output signal is connected over line FS to the A/D converter, digital voltmeter, or other signal-processing device.

Figure 2:
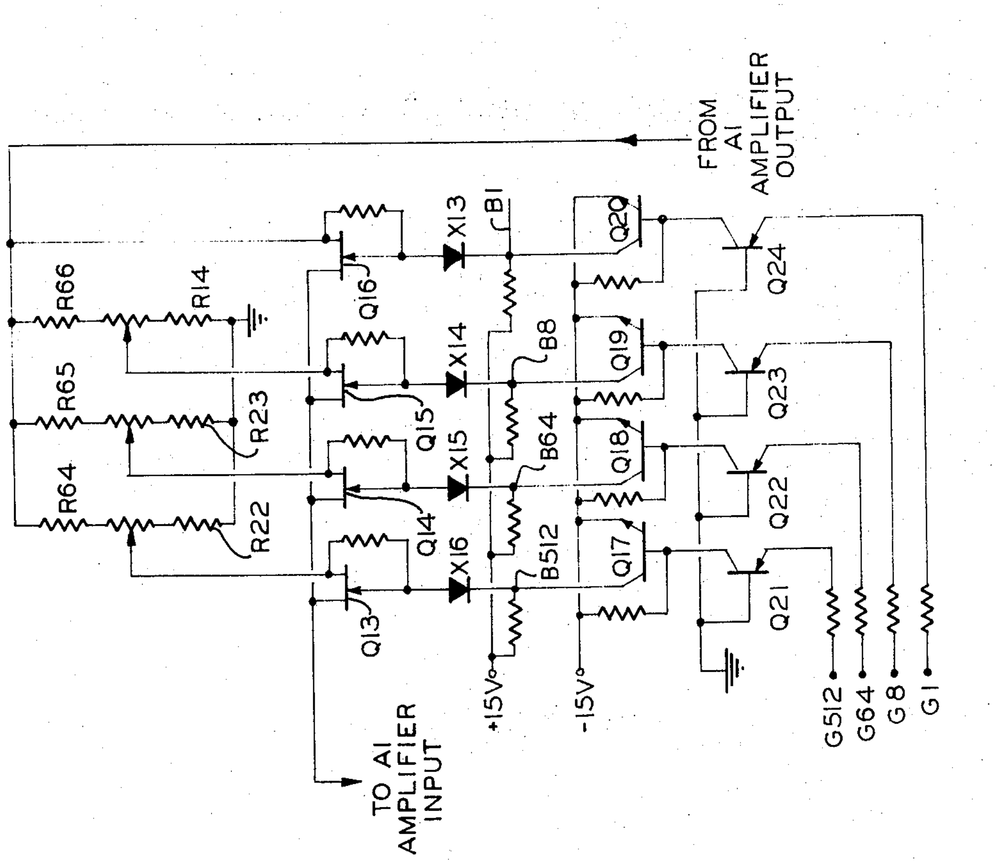
FIG. 2 is a schematic diagram of a gain control portion of the amplifier, which portion is shown in block form in FIG. 1.

In FIGS. 1*a*, 1*b* and 1, the feedback impedance of amplifier A1 is shown as a variable resistance symbol or a simple block labelled GAIN CONTROL, and the details of one suitable form of gain control are shown in FIG. 2. The output line of amplifier A1 is connected directly to the source electrode of transistor Q16 and connected across three voltage dividers to ground, with taps on each of the voltage dividers being connected to the source of a respective transistor, Q15, Q14 or Q13. Assuming that the loop gain of amplifier A1 is great, the overall gain of that amplifier is equal to 1 plus the reciprocal of the fraction of the amplifier output voltage that is fed back to the amplifier inverting input line. If it is desired that amplifier A1 have unity overall gain, transistor Q16 is turned on, connecting the A1 output directly to the amplifier input at the Q3B gate. When a gain of 8, 64 or 512 is desired, Q15, Q14 or Q13 instead connects the tap on its associated voltage divider to the input line. Only one of the four transistors Q13-Q16 is closed at a given time. The voltage dividers associated with Q15, Q14 and Q13 provide to those switches 1/7, 1/63 and 1/511 of the A1 output voltage, respectively, so that the A1 amplifier overall voltage gain becomes 8, 64 or 512 respectively.

Transistors Q17 to Q20 are all normally conducting heavily, so that their collectors present negative voltages to the gates of Q13 to Q16, and transistors Q21 to Q24 are all conducting, supplying base current to hold on Q17 to Q20, respectively. If unity gain is desired, a negative (logic 0) signal from the control unit is applied at terminal G1- to turn Q24 off, thereby cutting off Q20, back-biasing diode X13 and allowing Q16 to connect the A1 amplifier voltage output back to the A1 input. Similarly, if a gain of 8, 64 or 512 is desired, a negative signal at terminal G8-, G64- or G512- cuts off Q23 and Q19, or Q22 and Q18, or Q21 and Q17, back-biasing X14, X15 or X16, and turning on Q15, Q14 or Q13, and connecting one of the three voltage divider taps to the A1 amplifier inverting input line at the gate of Q3B. The voltage on line B1 at the collector of Q20 is used to turn on Q32 (FIG. 1) and by-pass resistor R2, to maintain loop gain in the A1, A2 loop when unity gain is selected for amplifier A1, and thereby to maintain integrating speed, as was described above. While the system has been shown provided with four programmable gain values, it will be apparent that more or less gain settings may be provided. The provision of a set of successive gain values which increase by factors of eight as shown is advantageous because the number eight is readily handled by the digital computer. It will be readily apparent that the successive values, if desired, could differ instead by some other factor, such as ten, for example, by minor changes to the voltage dividers of FIG. 2. It will also be apparent that successive gain steps need not increase by the same factor.

As previously mentioned, it was assumed in FIG. 1 that each input signal applied to lines AG and AB by the multiplexer emanated from a pair of lines which are both floating with respect to ground. In some applications, and particularly where lines AG and AB must be fairly long, floating lines are subject to noise and inductive pickup, and it becomes desirable to ground one of the lines. Such a system is partially illustrated in FIG. 3, which corresponds to FIG. 1 except for certain changes to be mentioned, and except that certain portions of FIG. 3 which may be the same as those of FIG. 1 are shown with less detail in FIG. 3.

Figure 3:
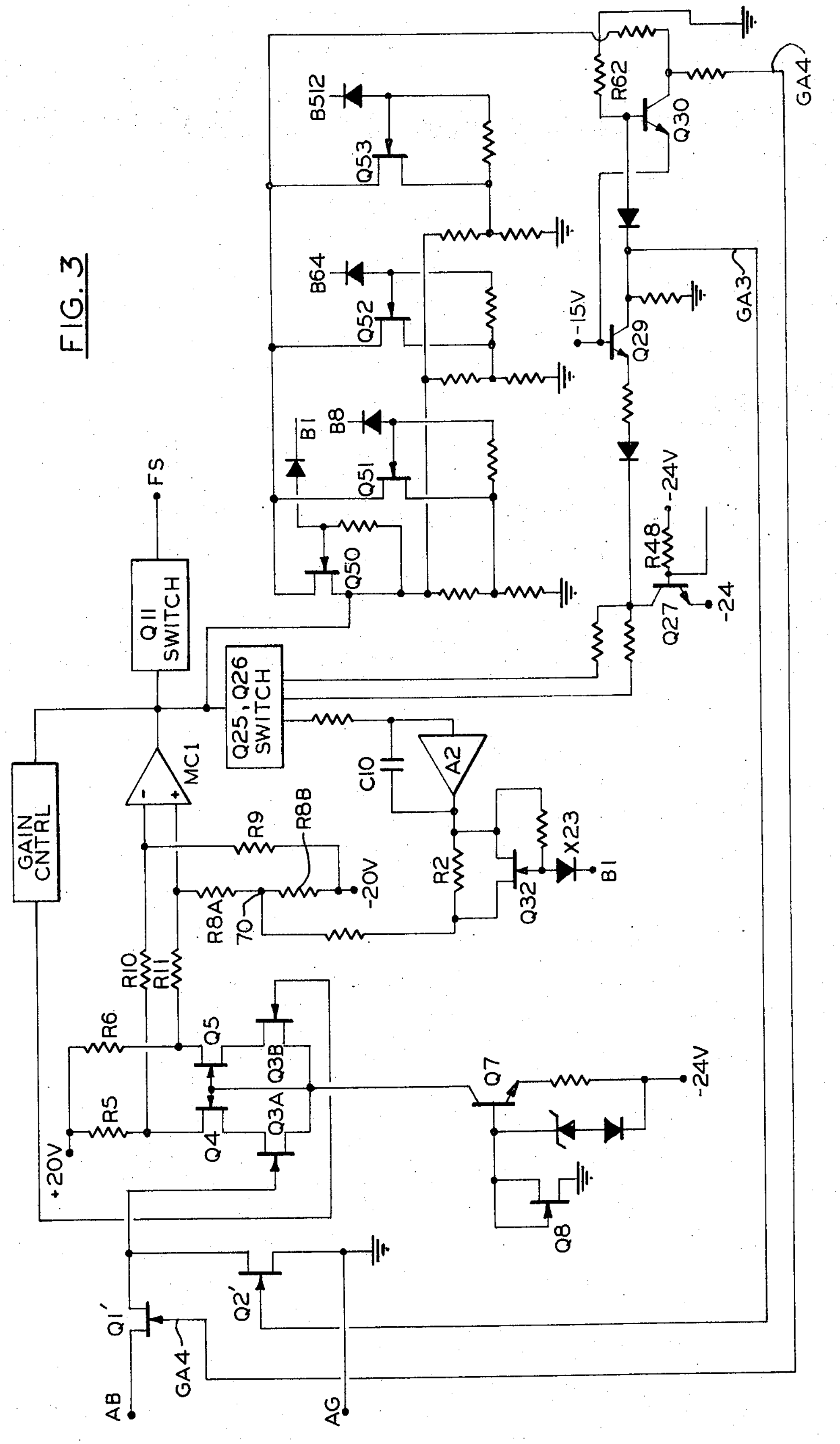
FIG. 3 is a schematic diagram illustrating the principles of one modification which may be made to the circuit of FIG. 1.

In FIG. 3, rather than floating with respect to the amplifier signal ground terminal, line AG is permanently connected thereto. Rather than connecting the A2 integrator offset-compensating output voltage in series with the input signal voltage between lines AB and AG to add the two voltages, the offset compensating voltage in FIG. 3 is added into the system at a point 70 within or inside the A1 amplifier. During the stabilizing mode switch Q1′ is open, switch Q2′ is closed to ground, and the switch formed by transistors Q25 and Q26 is closed. It will be seen that any offset voltage at the output of amplifier A1 will cause the A2, C10 integrator to charge up to a steady-state value such that the A2 output applied to point 70 will cause the amplifier A1 output to become zero, just as in FIG. 1. Because the A2, C10 integrator integrates until the A1 output becomes zero, it will be seen that the steady-state compensating voltage is effective to cancel both any offset occurring in the A1 differential stage of A1 and/or any offset occurring in the monolithic chip amplifier MC1 of amplifier A1. Since the compensating voltage from A2 is not amplified by the differential input stage of A1 in FIG. 3, a given amount of offset will result in a greater steady-state A2 output voltage in FIG. 3 than in FIG. 1. During the measurement mode, the Q25, Q26 switch is opened, shunt switch Q2′ is opened and series switch Q1′ is closed, and hence the input signal between lines AB and AG from the operated relay is applied to amplifier A1. The point 70 in FIG. 3 where the compensating voltage is shown introduced is a point which ordinarily is at or near ground potential with zero signal input, but it is not necessary that the compensating voltage be introduced at such a point. Various alternative techniques for adding the integrator offset-compensating voltage to the input signal voltage will readily occur to those skilled in the art as a result of this disclosure. It may be noted that while control signals GA3 and GA4 drive transistors Q1 and Q2 in FIG. 1, they are in effect interchanged in FIG. 3, so that GA4 controls Q1′ and GA3 controls Q2′ in FIG. 3. FIG. 3 also shows an added attenuator circuit comprising transistors Q50 to Q53 and associated components. The attenuator circuit is connected to receive the output voltage from chip MC–1 of amplifier A1 and to provide the correct voltage level (which varies with gain) to pull up the gate of the series input FET Q1′.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A signal-processing device for selectively applying a plurality of analog input signals to an output device with selected gains, comprising, in combination: a first amplifier having a negative feedback circuit; means for varying said feedback circuit to vary the overall gain of said first amplifier; an integrator circuit; first switching means for sequentially connecting said first amplifier and said integrator circuit in first and second modes, said first switching means being operable in said first mode to connect said first amplifier and said integrator circuit in a degenerative closed loop to cause said integrator circuit to charge to a steady-state output signal level commensurate with any offset voltage existing in said first amplifier, and operable in said second mode to disable said integrator circuit, apply said steady-state output signal to said first amplifier to compensate for said offset voltage, and apply a selected one of said analog input signals to said first amplifier; and second switching means for connecting the output of said first amplifier to said output device while said first amplifier is connected in said second mode.

2. A device according to claim 1 wherein said integrator circuit comprises a second amplifier and a capacitor.

3. A device according to claim 1 wherein said first amplifier has a differential input circuit including first and second input terminals, said negative feedback circuit of said first amplifier being connected between the output terminal of said first amplifier and the first of said input terminals, and said first switching means being operable to connect said selected one of said analog input signals to the second of said input terminals during said second mode.

4. A device according to claim 1 wherein said first switching means is operable during said second mode to apply said steady-state output signal and said selected one of said analog input signals connected in series to said first amplifier.

5. A device according to claim 1 wherein said first switching means is operable during said second mode to apply said selected one of said analog input signals to a first stage of said first amplifier and to apply said steady-state output signal to a different stage of said first amplifier.

6. A device according to claim 1 having a floating source for providing said selected one of said analog input signals, said first amplifier having an input circuit including first and second input terminals, one side of said source being connected to said first input terminal, said first switching means being operable during said second mode to connect said steady-state output signal to the other side of said source.

7. A device according to claim 1 having a source for providing said selected one of said analog input signals, said first amplifier comprising a plurality of cascaded amplifying stages including a first stage having first and second input terminals and further stages, one side of said source being connected to one of said input terminals, said first switching means being operable during said second mode to connect the other side of said source to the other of said input terminals and to apply said steady-state output signal to one of said further stages.

8. Apparatus for selectively connecting individual ones of a group of analog input signals to a signal-processing device through a controllable-gain amplifier which is subject to drift, comprising, in combination: first selective switching means operable over a first-time interval to selectively connect an individual one of said input signals to said amplifier; second selective switching means operable to control the gain of said amplifier; offset voltage measuring means controllable by third switching means to derive a compensating signal commensurate with the offset of said amplifier; fourth switching means operable to apply said compensating signal to said amplifier to compensate for said drift; timing means; computer means for applying signals to simultaneously operate said first and second selective switching means and said timing means, said timing means being operative to operate said third switching means for a first predetermined time period extending beyond said first time interval and then operative to disable said third switching means and enable said fourth switching means.

* * * * *